United States Patent Office 3,337,358
Patented Aug. 22, 1967

3,337,358
PROCESS OF MANUFACTURING A PIGMENT FROM TITANIUM DIOXIDE AND ZINC OXIDE
Jacobus Carolus Antonius Vossen, Groenekan, Netherlands (24 Mariastraat, Venlo, Netherlands)
No Drawing. Filed Dec. 10, 1963, Ser. No. 329,353
Claims priority, application Germany, Oct. 10, 1958, V 15,186
9 Claims. (Cl. 106—292)

This invention relates to methods of manufacturing pigments.

This application is a continuation-in-part application of my copending application, Ser. No. 843,940 filed Oct. 2, 1959, now abandoned.

It is known that titanium dioxide has better covering characteristics than zinc oxide relative to the use as paint pigments. It is also known that titanium dioxide has the disadvantage of chalking and of bleaching colored pigments with which it is blended when exposed to light and especially to ultraviolet rays and when exposed to weather conditions. The reason for this is that titanium dioxide is characterized by substantial photochemical activity.

For this reason, titanium dioxide pigments have been blended with zinc oxide pigments in an attempt to obviate these disadvantages. These attempts, however, have not been successful.

Other attempts have also been made to eliminate these disadvantages by manufacturing zinc titanates obtained by maintaining zinc oxide and titanium dioxide in a proportion of 0.9–2.1 mols of ZnO to 1 mol of $TiO_2$ at temperatures between 500° and 1000° C. until at least 95% of the zinc oxide is changed to zinc titanate crystals of the spinel or corundum type.

It has been further suggested that there be manufactured as a pigment a zinc titanate with a hexagonal symmetry and an ilmenite structure by heating a mixture of gamma-titanic acids and zinc oxide until only zinc oxide titanate remains. However, even the zinc titanate pigments thus produced have the aforesaid disadvantages.

An object of the invention is to provide for the production of a pigment consisting partly of titanium oxide which does not have the above-mentioned drawbacks.

The invention is based on the principle that a reaction, in dry state, of zinc oxide and titanium dioxide is a reaction of diffusion and on the principle that the intensity of the photochemical reaction in the dry state depends mainly on the energy of diffusion used.

A low energy of diffusion is obtained only when using raw materials the crystals of which exhibit lattice irregularities due, for instance, to the presence of impurities or foreign matter. Titanium dioxide generally shows such crystallization defaults due, for instance, to the inclusion of phosphate ions, sulphate ions or to the presence of $Al_2O_3$, $SiO_2$ or ZnO.

A further important parameter for the production of a reaction, in dry state, of titanium oxide and zinc oxide, which requires such a low energy or diffusion that by its use as a pigment a neglectable photo-chemical reaction occurs, is the nature of the zinc oxide used. The crystal shape of the zinc oxide particles used according to the invention can be determined by magnification with a microscope. For the manufacture of a zinc titanate capable of being utilized as a pigment, is suitably a highly developed acicular sulphated zinc oxide with a sulphur content of at least 0.1% in the form of $SO_3$, with at least 0.04% S, prepared by slow oxidation of zinc vapors (see e.g. U.S.P. 2,200,873).

This highly developed acicular zinc oxide consists of long needles, a substantial portion having a length between 5 and 8 microns.

The method used for the preparation of said zinc oxide was that described in the U.S.P. Ser. No. 2,200,873, e.g. the procedure used may be somewhat as follows:

The zinc vapor which is to be combusted is initially in a non-oxidized state and after it has been rarified with non-oxidizing gas to 3 to 16 times its original volume, it is conducted into a combustion chamber, in which air is fed in such quantities that only a small excess of oxygen with respect to the zinc is present.

The volume of zinc vapor fed in every minute must not be greater than a 25th part of the chamber volume. The temperature in the chamber should be higher than 950° C., but preferably less than 1200° C. The combustion of the zinc is carried out slowly under these conditions and the long duration of the zinc oxide in the hot chamber contributes to the growth of the formed crystals into well developed needles.

The zinc vapor must therefore be produced by evaporation of zinc metal or by reduction of zinc ore with fuel in the zinc furnace or zinc retort, thereby briquettes can be laid on the ore to support the reduction. All the soot is burnt away, because of the long duration in the combustion chamber and at the same time the sulphur of all the sulphurous compounds is changed into sulphate.

The sulphur content and especially when in the form of the zinc sulphate, can be controlled quite easily by the use of sulphur-containing ores and/or more or less sulphur-containing fuel used for reduction.

A mixture provided in accordance with the invention will contain about 0.45–1.1 mols titanium dioxide to 1 mol zinc oxide, as will be seen from the following examples. The temperature of calcination can range from 500° to 1000° C., but is preferably below 900°. This treatment lasts until no more than 5% free zinc oxide is to be found in the calcined mixture.

By conventional final treatments of pigments, as for example, necessary to disintegrate the agglomerates formed during calcination, various properties of the pigment produced can be further improved.

With the zinc oxide applied up to now, irrespective of whether it has been prepared according to the "French" process or the "American" process, and even with the particularly high disperse "zinc oxide active" activation energies of 70 kcal. and more are found.

With the commercial acicular zinc oxide one finds, however, as activation energy 53 kcal., when the acicular zinc oxide is very pure, and 40 kcal. and less, when the zinc oxide is contaminated with some sulphur, viz. with at least 0.04% S, as it is mostly the case with the commercial acicular zinc oxide. This effect is highly surprising, for the acicular zinc oxide is produced by slow combustion of Zn vapor. Thereby an undisturbed growth of crystal needles is attained being about five times longer than the shorter needles one can find in the usual zinc oxide prepared according to the "American process." Consequently one should expect that the acicular zinc oxide with its ZnO crystals grown in an undisturbed way would give the greatest activation energy and the least quick conversions, with as consequence a zinc titanate, which is undesirably photo-active.

For, crystals grown in an undisturbed way have fewest lattice defects and consequently are least active, moreover they have a relatively small surface, so that the number of points of contact between ZnO and the titanium component ($TiO_2$) is also relatively small. These considerations must restrain the expert from using "acicular zinc oxide" for the preparation of zinc titanate.

It is consequently completely surprising that the acicular zinc oxide is in fact particularly suitable for the preparation of zinc titanate, and it is already a surprising moment, that in the first place the type of ZnO and not the type of $TiO_2$ determines the quick proceeding of the conversion. For, $TiO_2$ is chemically considerably more inert than ZnO and moreover melts at a temperature being about 400° C. higher (about 1800° C.).

*Example 1*

170 grams titanium dioxide in the form of rutile containing 94% $TiO_2$ and 330 grams of sulphated acicular zinc oxide containing 0.2% of $SO_3$ are made into an aqueous paste and are carefully mixed. The mol ratio of $TiO_2$ to ZnO is about .5:1. After drying and grinding, the mixture is heated at a temperature of 850° C. for one-half of an hour.

A film of paint manufactured with this pigment possesses an extraordinary covering power, a very high whiteness and does not chalk.

*Example 2*

An aqueous paste is made with 640 units by weight of a suspension of titanium oxide hydrate containing 30% $TiO_2$ (calculated on the dry matter) together with 205 units by weight of sulphated acicular zinc oxide. The mol ratio of ZnO to $TiO_2$ is about 1:1. This paste is partly dehydrated, after which it is conveyed through a rotary furnace. The time of passage is such that the final product contains only 4% free zinc oxide which does not react in the dry state with the titanium dioxide. The temperature of the furnace in the calcining zone was kept at 750° C.

In the above examples, the acicular zinc oxide had been prepared as indicated in Pat. 2,200,873.

A film of paint manufactured with a pigment thus produced has a good covering power, a very high whiteness, and does not chalk.

It appears from the following how the acicular zinc oxide favorably influences the photo-activity or expressed differently the non-chalking of the zinc titanate prepared therewith:

According to Example 1 zinc orthotitanate was prepared, one time with commercial acicular zinc oxide, another time with the "zinc oxide white seal" usual in the paint industry prepared according to the "French process." With both types of zinc titanate according to the same recipe a phthalic resin finishing paint desiccating in a glossy way was made. Both were brushed on a glass plate and examined for their non-chalking properties in an accelerated weathering apparatus.

A test cycle consisted of:

(a) 8 hours moist air, ultraviolet radiation (Hg lamp);
(b) 1 hour very moist air (95% relative moisture);
(c) 15 hours dry air.

With (b) and (c) radiation was omitted.
After 12 cycles the test was stopped.
Result: The paint containing the zinc titanate prepared with "zinc oxide white seal" showed clear chalking characteristics after 8 cycles. The paint containing the zinc titanate prepared with acicular zinc oxide first started to show chalking after 12 cycles.

With another comparative test phthalic resin finishing paints were prepared with the same volume percentage in the dried paint layer. Three types of pigment were compared with each other: zinc metatitanate and zinc orthotitanate, both prepared with commercial acicular zinc white and the usual coated rutile $TiO_2$ pigment "RANC."

The three paints were brushed on planks, which were first prepared in the usual manner. After that the paint layers were dried indoors for about 1 week, then the planks were placed on a field exposure rack directed to the south having an angle of 45°. The following was observed:

After 16 months the rutile pigment chalked moderately to strongly and the two zinc titanate types did not chalk at all (zinc metatitanate) or substantially not (zinc orthotitanate). Only after 24 months did the two zinc titanate pigments show any tendency to chalking; the rutile pigment now chalked very strongly. The beneficial properties of the acicular zinc oxide in the preparation of zinc titanate is stressed moreover by a test with zinc titanate, which was not prepared with acicular zinc oxide. On this test the paint failed after 9 months.

What is claimed is:

1. A process for the production of a substantially non-chalking zinc titanate comprising reacting with titanium dioxide and in dry state zinc oxide in the form of highly developed acicular sulphated zinc oxide with a sulphur content of at least 0.1% in the form of $SO_3$ and at least 0.04% S by heating the resulting mixture at a temperature of from 500–1000° C. until no more than 5% free zinc oxide remains in the mixture, the mol ratio of titanium dioxide to zinc oxide being in the range of about .45–1.1:1.0, said acicular zinc oxide being in the form of needles of approximately 5–8 microns length.

2. A process for the production of a substantially non-chalking zinc titanate comprising reacting with titanium dioxide and in dry state zinc oxide in the form of highly developed acicular sulphated zinc oxide with a sulphur content of at least 0.1% in the form of $SO_3$ and at least 0.04% S by forming an aqueous paste of said zinc oxide and titanium dioxide, drying the paste and heating the resulting mixture at a temperature of from 500–1000° C. until no more than 5% free zinc oxide remains in the mixture, the mol ratio of titanium dioxide to zinc oxide being in the range of about .45–1.1:1.0, said acicular zinc oxide being in the form of needles of approximately 5–8 microns length.

3. A method as claimed in claim 1 wherein said ratio is about 0.5:1.

4. A method as claimed in claim 1, wherein said ratio is about 1.0:1.0.

5. A method as claimed in claim 3, wherein the titanium dioxide is in the form of rutile.

6. A method as claimed in claim 4, wherein the titanium dioxide is derived from a suspension of titanium oxide hydrate.

7. A method as claimed in claim 1, wherein the temperature of the reaction is less than 900° C.

8. A process for the production of a substantially non-chalking zinc titanate comprising reacting in a dry state a mixture of acicular sulphated zinc oxide and titanium dioxide to form zinc titanate, the acicular sulphated zinc oxide being prepared by the reaction of zinc vapors of zinc ores with a minimum quantity of oxygen from air to form zinc oxide, the formation of the zinc oxide being performed in a combustion chamber at a temperature between 950 and 1200° C. to enable the crystalline zinc oxide to assume an acicular shape constituted of slender needles having a length of approximately 5 to 8 microns, the acicular zinc oxide being contacted in the combustion chamber with sulfur to form acicular sulfated zinc oxide with a sulfur content of at least 0.1% calculated as $SO_3$ and with at least 0.04% S, the reaction of the titanium dioxide and the acicular sulfate zinc oxide being obtained by heating the resulting mixture at a temperature from between 500 to 1000° C. until less than 5% free zinc oxide remains in the mixture, the mol ratio of titanium dioxide to zinc oxide being in the range about 0.45–1.1:1.0.

9. A process as claimed in claim 8 wherein said titanium dioxide and acicular sulfated zinc oxide are combined by forming an aqueous paste, and drying the paste.

References Cited

UNITED STATES PATENTS

| | | | |
|---|---|---|---|
| 1,750,287 | 3/1930 | Specht | 106—296 |
| 2,021,990 | 11/1935 | Depew | 106—296 |
| 2,200,873 | 5/1940 | Cyr | 23—147 |
| 2,253,551 | 8/1941 | Booge | 106—296 |
| 2,379,019 | 6/1945 | McCord et al. | 106—300 |

FOREIGN PATENTS 583,236   1/1960   Belgium.

OTHER REFERENCES

Kekwick et al.: Paint Manufacture, January 1938, pp. 22 and 23.

TOBIAS E. LEVOW, *Primary Examiner.*

J. POER, S. E. MOTT, *Assistant Examiners.*